US011952258B2

(12) United States Patent
Vandenburg

(10) Patent No.: US 11,952,258 B2
(45) Date of Patent: Apr. 9, 2024

(54) FLAVORING DISPENSER FOR A BEVERAGE CONTAINER

(71) Applicant: NUMAAC LLC, Henderson, NV (US)

(72) Inventor: Joshua Vandenburg, Henderson, NV (US)

(73) Assignee: NUMAAC LLC, Henderson, NV (US)

( * ) Notice: Subject to any disclaimer, the term of this patent is extended or adjusted under 35 U.S.C. 154(b) by 385 days.

(21) Appl. No.: 17/481,084

(22) Filed: Sep. 21, 2021

(65) Prior Publication Data

US 2022/0089426 A1 Mar. 24, 2022

Related U.S. Application Data

(60) Provisional application No. 63/207,546, filed on Mar. 8, 2021.

(51) Int. Cl.
*B65D 81/32* (2006.01)
*B65D 17/00* (2006.01)
*B67D 3/00* (2006.01)

(52) U.S. Cl.
CPC ........... *B67D 3/0019* (2013.01); *B65D 17/02* (2013.01); *B65D 81/3211* (2013.01); *B67D 3/0067* (2013.01); *B65D 2517/0056* (2013.01)

(58) Field of Classification Search
CPC .... B65D 51/2842; B65D 41/32; B65D 41/46; B65D 51/22; B65D 47/106; B65D 81/3205; B65D 21/0238; B65D 2543/0012
USPC ........................... 206/222; 222/207; 141/364
See application file for complete search history.

(56) References Cited

U.S. PATENT DOCUMENTS

| | | | | | |
|---|---|---|---|---|---|
| 4,054,205 | A * | 10/1977 | Blow, Jr. | B65D 81/3205 206/217 |
| 5,209,348 | A * | 5/1993 | Schafer, III | A47G 19/02 220/575 |
| 5,431,276 | A * | 7/1995 | Lialin | B65D 51/2828 206/217 |
| 5,934,493 | A * | 8/1999 | Han | B65D 51/2835 206/568 |
| 5,979,647 | A * | 11/1999 | Han | B65D 51/2828 206/568 |
| 7,163,129 | B1 * | 1/2007 | Bennett | B65D 81/3216 221/199 |
| 7,217,434 | B1 * | 5/2007 | Loh | B65D 81/3205 206/217 |
| 8,302,803 | B1 | 11/2012 | Greenberg et al. | |
| 8,522,968 | B2 | 9/2013 | Middleman et al. | |
| 10,624,501 | B2 * | 4/2020 | Petitt | B65D 81/3283 |
| 11,345,535 | B2 | 5/2022 | Staus | |

* cited by examiner

*Primary Examiner* — Timothy P. Kelly
(74) *Attorney, Agent, or Firm* — Jeff B. Vockrodt; Culhane Meadows PLLC

(57) ABSTRACT

A flavor dispenser adapted to be attached to the top of a beverage container, for example a beer can, is provided. The flavor dispenser includes one or more easily fillable flavor containers, and passages that allow the one or more flavorings to be mixed with the beverage by the user and discarded with the beverage container.

20 Claims, 6 Drawing Sheets

FLAVORING DISPENSER FOR A BEVERAGE CONTAINER

This application claims priority to U.S. Provisional Application No. 63/207,546, filed Mar. 22, 2021 and U.S. Provisional Application No. 63/204,210, filed Sep. 21, 2020, both of are incorporated by reference herein in its entirety.

BACKGROUND OF THE INVENTION

Adding small amounts of flavoring to certain beverages has been popular. For example, lime juice and salt/flavorings may be added to beer. The addition of salt/flavorings has been imprecise, unsanitary, and messy, where lime may be squeezed or pushed into the bottle followed by addition of the salt and/or flavorings. Attempts have been made to control this process in the case of a bottle. U.S. Pat. No. 8,522,968, entitle "Beverage Flavoring Applicator," granted Sep. 3, 2013 describes a system that utilizes a cup assembly holding two cups that can be ruptured and the contents dispensed into a bottle. The system is complicated and particularly adapted to bottles.

Accordingly, there remains a need for continued improvement in the delivery of various flavoring substances to a beverage container, particularly canned beverages.

SUMMARY OF THE INVENTION

In one embodiment, the present invention involves a flavoring dispenser (100) for a beverage comprising: a semicircular or circular ridge (101) defining an arc and adapted to secure the flavoring dispenser on the rim (102) of a container (103) of the beverage; at least a first favoring container (104), the first flavoring compartment being defined at least partially by a first elevated region (105) of the beverage flavoring dispenser that at least partially extends around the arc defined by the ridge, and a second elevated region (106) that extends from a first point (107) on the arc defined by the ridge to a second point (108) on the arc defined by the ridge, the second elevated region comprising at least a first passage (109); and a film having a first film region (110) and a second film region (111), and at least one separation line (112) dividing at least a portion of the first film region and the second film region, the first film region adapted to enclose one or more contents of the flavoring dispenser and the second film region adapted to being removed in order to expose at least the first passage and allow the one or more contents of the flavoring dispenser to be dispensed and consumed with the beverage.

In another aspect, the flavoring dispenser may further comprise a second flavoring compartment (113) defined by the first elevated region and the second elevated region and further defined by a first partition between the first flavoring compartment and the second flavoring compartment comprising a third elevated region (114), the third elevated region extending from a third point (115) on the arc defined by the ridge to the second elevated region, the second elevated region comprising at least a second passage (116) adapted to allow contents of the second flavoring compartment to be dispensed and consumed with the beverage. The flavoring dispenser may also comprise a third passage (117) in the second elevated region adapted to allow contents of the second flavoring compartment to be dispensed and consumed with the beverage.

In another aspect, the flavoring dispenser may further comprise a third flavoring compartment (118) defined by the first elevated region and the second elevated region and further defined by a second partition between the first flavoring compartment and the third flavoring compartment comprising a fourth elevated region (119), the fourth elevated region extending from a fourth point (120) on the arc defined by the ridge to the second elevated region, the second elevated region comprising at least a fifth passage (121) adapted to allow contents of the second flavoring compartment to be dispensed and consumed with the beverage. The flavoring dispenser may also comprise a sixth passage (122) in the second elevated region adapted to allow contents of the third flavoring compartment to be dispensed and consumed with the beverage.

In other aspects, the flavoring dispenser may further comprise a flat region (123) adapted to allow the one or more contents of the flavoring dispenser to flow into the container of the beverage. The second film region may comprise a first tab (124) that facilitates removal of the second film region, and/or a centrally located tab (125). The flavoring dispenser when attached to the container of the beverage may be adapted to cover at least a portion of a tab (126) for opening the container of the beverage. The flavoring dispenser may also be adapted to leave exposed an opening (127) of the container of the beverage after the flavoring dispenser has been attached to the container of the beverage.

In another aspect, the invention relates to a method of making a flavoring dispenser comprising: (1) adding at least one flavoring component to a first flavoring compartment of an unsealed flavoring dispenser, the unsealed flavoring dispenser, and (2) attaching a film to the unsealed flavoring dispenser, the a film having a first film region (110) and a second film region (111), and at least one separation line (112) dividing at least a portion of the first film region and the second film region, the first film region adapted to enclose one or more contents of the flavoring dispenser and the second film region adapted to being removed in order to expose at least the first passage and allow the one or more contents of the flavoring dispenser to be dispensed and consumed with the beverage. In this case, the unsealed flavoring dispenser may be any of the dispensers described herein, including variations on the dispensers that would be apparent to a person having skill in the art upon consideration of those disclosed herein. In one aspect, the attaching step may comprise using one or more adhesives, or a thermal bonding step with or without adhesive. Any adhesive may be applied to the film before the attaching step. Where multiple flavoring components are utilized, a mixture of solid and liquid flavoring components may be utilized. The solids and liquids may be separated in the container and mixed upon use.

Also contemplated are methods of using the flavor dispenser described above. The method may generally involve opening a beverage, placing the flavoring dispenser on the beverage can, and removing the second film region. In one aspect, removing the second film region may comprise tearing along a perforated portion of the film defining the separation line. These methods allow a user to enjoy a flavor added to the beverage at the time of use and avoid one or more inconvenient, messy or unsanitary steps.

DETAILED DESCRIPTION OF THE INVENTION

The present invention relates to a flavoring dispenser for a beverage container, methods of making such a flavoring dispenser, and methods of use thereof. The flavoring dispenser is generally a single-use dispenser that the user can easily fit to the top of an open beverage container, and preferably an aluminum can used for beer or soft drinks. The flavor dispenser can be adapted to hold either solid or liquid flavors, or a combination of solid and liquid flavors. In one aspect, the flavoring dispenser is adapted to provide a lime juice and spicy salt mixture to beer, which is commonly referred to as michelada. Other flavors are contemplated, such as for example a candy flavor that can be added to a soft drink.

The flavoring dispenser includes a lower surface that is adapted to snap into place over the container of the beverage. In the case of an aluminum can beverage container, the flavoring dispenser is snapped onto the rim of the aluminum can after it has been opened by the user. The user can then remove the detachable portion of a film that is placed over the flavoring dispenser that allows flavor components to be released out of the flavoring compartments within the flavoring dispenser. In some cases the user may force flavoring in out of the container by pressing on the portion of the film that remains in place after the detachable portion has been removed. This may be particularly important for viscous liquid flavoring components. The dispenser may remain in place while the beverage is being consumed. The user may wish to gradually release flavor component as the beverage is consumed, or may wish to dispense all of the flavor. The flavor dispenser may be removed from the beverage container after flavor components are dispensed. Alternatively, the flavor dispenser may remain in place while the beverage is consumed, and if desired can be discarded with the empty beverage container.

The flavor dispenser may be made of a suitable plastic material. In some embodiments the plastic may be a polystyrene (PS) or polyethylene terephthalate (PET) plastic. Alternatively, the flavor dispenser may be made of an edible plastic material such as polylactic acid (PLA). The edible plastic may alternatively be made from seaweed, potato starch or milk proteins, in a manner similar to existing edible packaging materials.

Figure 1A:
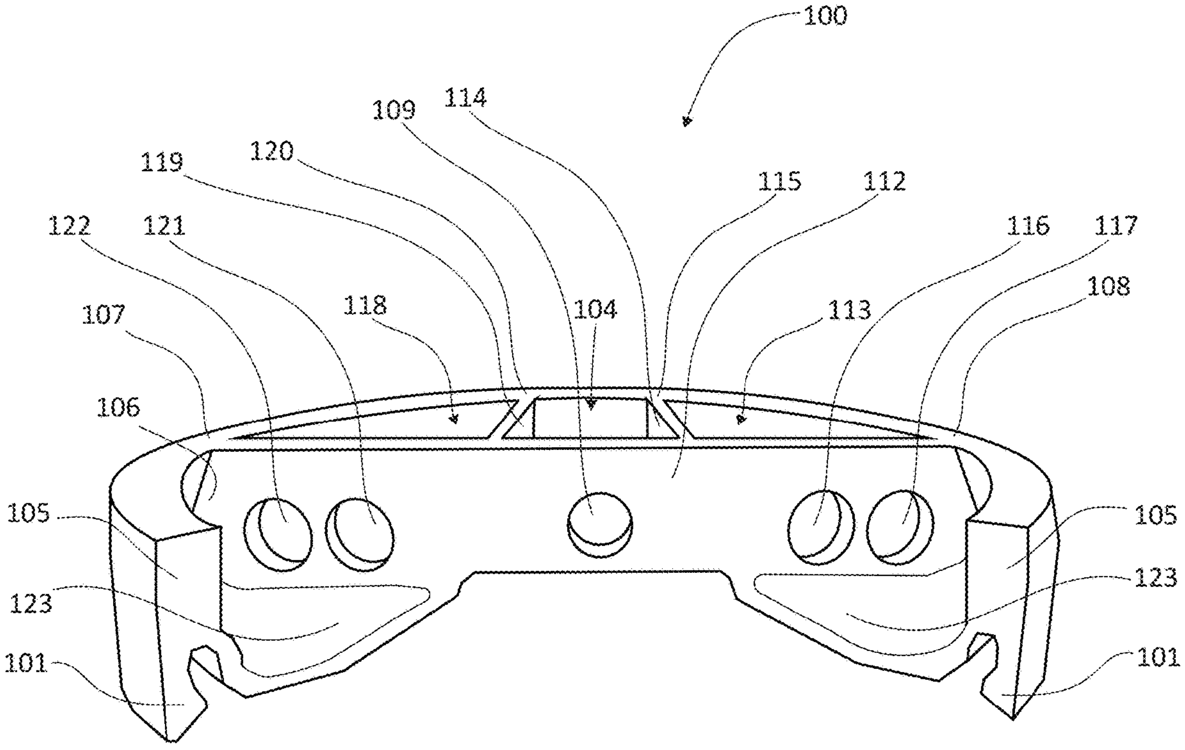
FIG. 1A shows a flavor dispenser for a beverage container according to an aspect of the invention.

FIG. 1A shows a flavor dispenser 100 for a beverage container according to an aspect of the invention. The flavor dispenser can be attached to the rim of a beverage container, e.g., an aluminum beer can, using a semicircular or circular ridge 101. The ridge defines at least an arc and is adapted to secure the flavoring dispenser on the rim 102 of a container 103 of the beverage. The term "arc" is used herein to describe a portion of a circle or semicircle that tracks the rim of the beverage container. Positions on the "arc" determine the location of elevated portions that define containers of the flavor dispenser. The term "arc" does not therefore denote a physical object, but rather a point of reference for defining positions of elevated regions.

A first favoring container 104 is defined at least partially by a first elevated region 105 of the beverage flavoring dispenser that at least partially extends around the arc defined by the ridge 101. A second elevated region 106 that extends from a first point 107 on the arc defined by the ridge to a second point 108 on the arc defined by the ridge, the second elevated region comprising at least a first passage 109. A second flavoring compartment 113 us is defined by the first elevated region 105 and the second elevated region 106 and further defined by a first partition between the first flavoring compartment and the second flavoring compartment comprising a third elevated region 114, the third elevated region extending from a third point 115 on the arc defined by the ridge to the second elevated region 106, the second elevated region comprising at least a second passage 116 adapted to allow contents of the second flavoring compartment to be dispensed and consumed with the beverage. An optional third passage 117 in the second elevated region adapted may be provided to allow contents of the second flavoring compartment to be dispensed and consumed with the beverage. The passages are shown as circular passages although any shape may work, including rectangular, oval and/or square.

A third flavoring compartment 118 defined at least partially by the first elevated region and the second elevated region and further defined by a second partition between the first flavoring compartment and the third flavoring compartment comprising a fourth elevated region 119. The fourth elevated region extends from a fourth point 120 on the arc defined by the ridge to the second elevated region, the second elevated region comprising at least a fifth passage 121 adapted to allow contents of the second flavoring compartment to be dispensed and consumed with the beverage. An optional fifth passage 122 in the second elevated region adapted may be provided to allow contents of the second flavoring compartment to be dispensed and consumed with the beverage.

The second elevated region 106 extends across the flavor dispenser and serves as a barrier between the flavor compartments and the beverage can. Where passages are provided closer to the side of the can, it may be desirable to provide a flat portion 123 that can guide flavor agents toward the opening of the can (shown in later figures). Although the embodiment shown has flat portion below passages 116, 117, 121, and 122, the flat portion may also extend below passage 104. In one case, the flat portion may enclose the entire top surface of the can except for the can opening. This would allow flavoring agent to be delivered to the contents of the can without ever coming into contact with the top surface of the can.

Figure 1B:
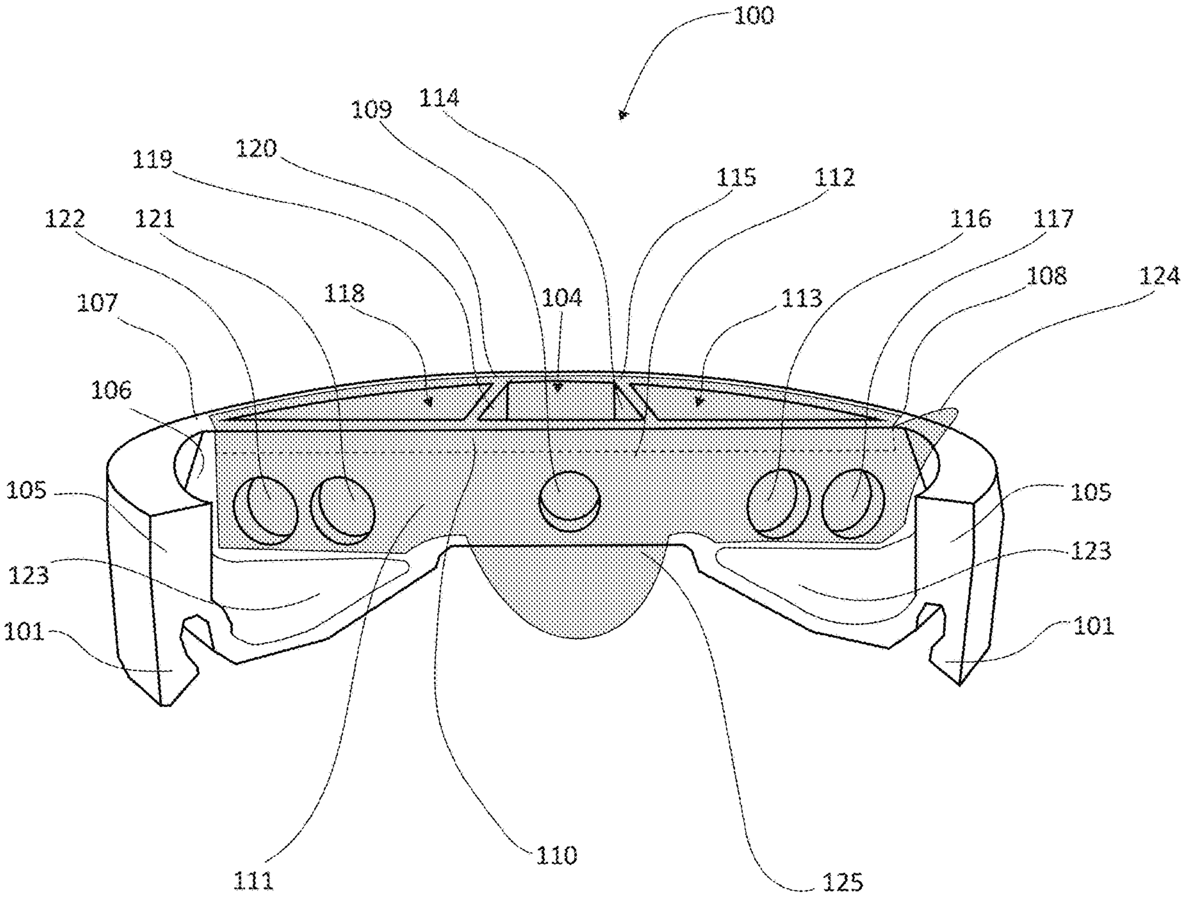
FIG. 1B shows the flavor dispenser of FIG. 1 with a selectively removable film according to another aspect of the invention.

FIG. 1B shows the body of the flavor dispenser of FIG. 1 with a film applied to it. The film has a first film region 110 and a second film region 111, and at least one separation line 112 dividing at least a portion of the first film region and the second film region. The first film region is adapted to enclose one or more contents of the flavoring dispenser and the second film region is adapted to being removed in order to expose at least the first passage and allow the one or more contents of the flavoring dispenser to be dispensed and consumed with the beverage. The film may include graphics on the outward facing sides. The graphics may be displayed on the first film region if they are intended to remain while the beverage is being consumed. The graphics may also be provided on the second film region. The film or portions thereof may be made translucent in order to expose and embossed message provided on the body of the flavor dispenser.

Although the film is shown as a single piece, the film may be provided as two separate films applied on either side of the dividing line 112. In some embodiments, the first film enclosing the contents may be adhered to the top surface of the flavor dispenser using an adhesive that is intended to permanently affix the film to the top surface of the flavor dispenser. The second film in this case is placed below the separation line 112 and covers the passages that allows the contents of the flavoring dispenser to be dispensed during use. The second film may be adhered using an adhesive that is less permanent than the adhesive used to adhere the first film. It is desirable that the second adhesive adhere more strongly to the film than the surface of the flavor dispenser body so that the adhesive is removed cleanly from the flavor dispenser when the user removes the second film.

Figure 1C:
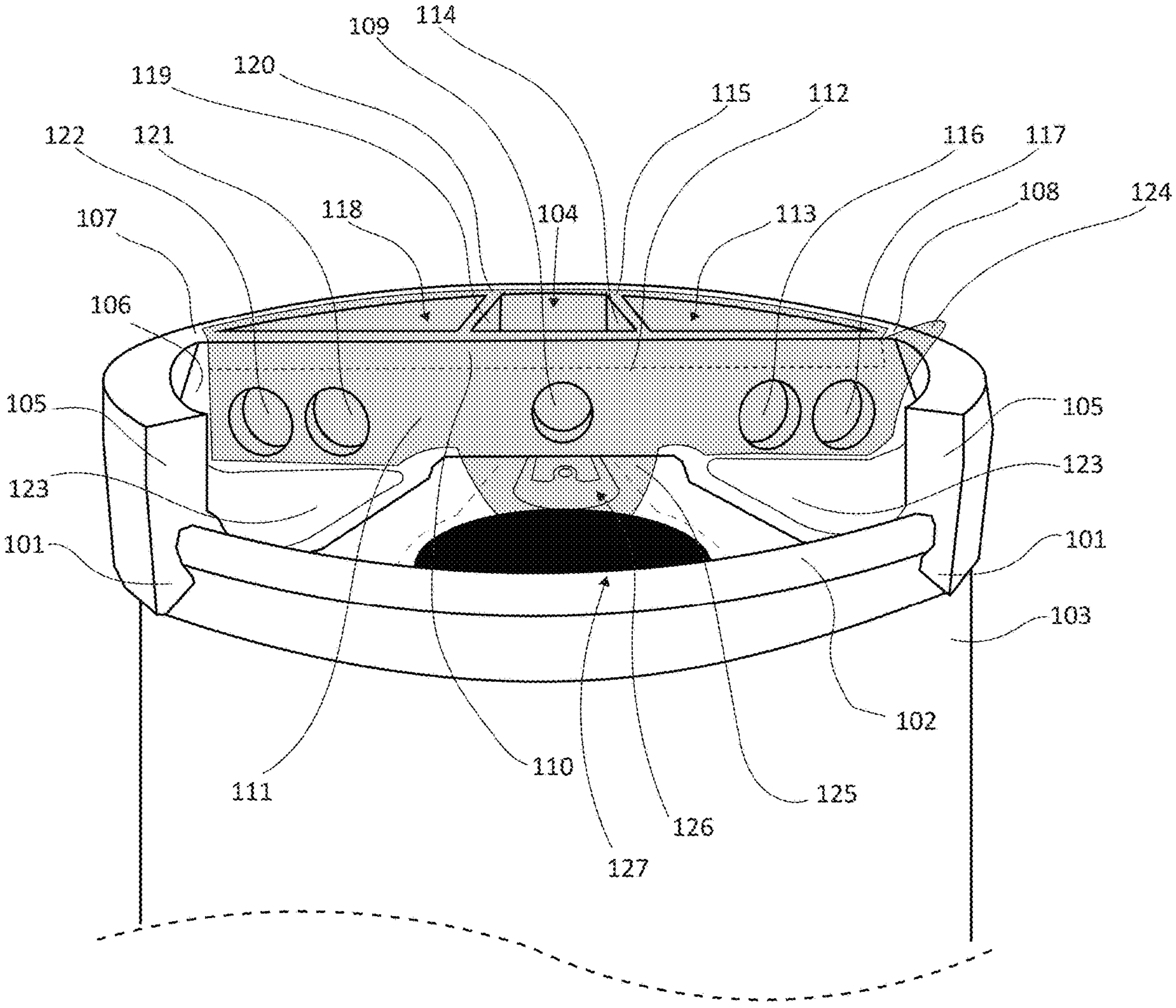
FIG. 1C shows the assembly of FIG. 1B attached to an open beverage can where the flavor dispenser is in an unopened state.
Figure 1D:
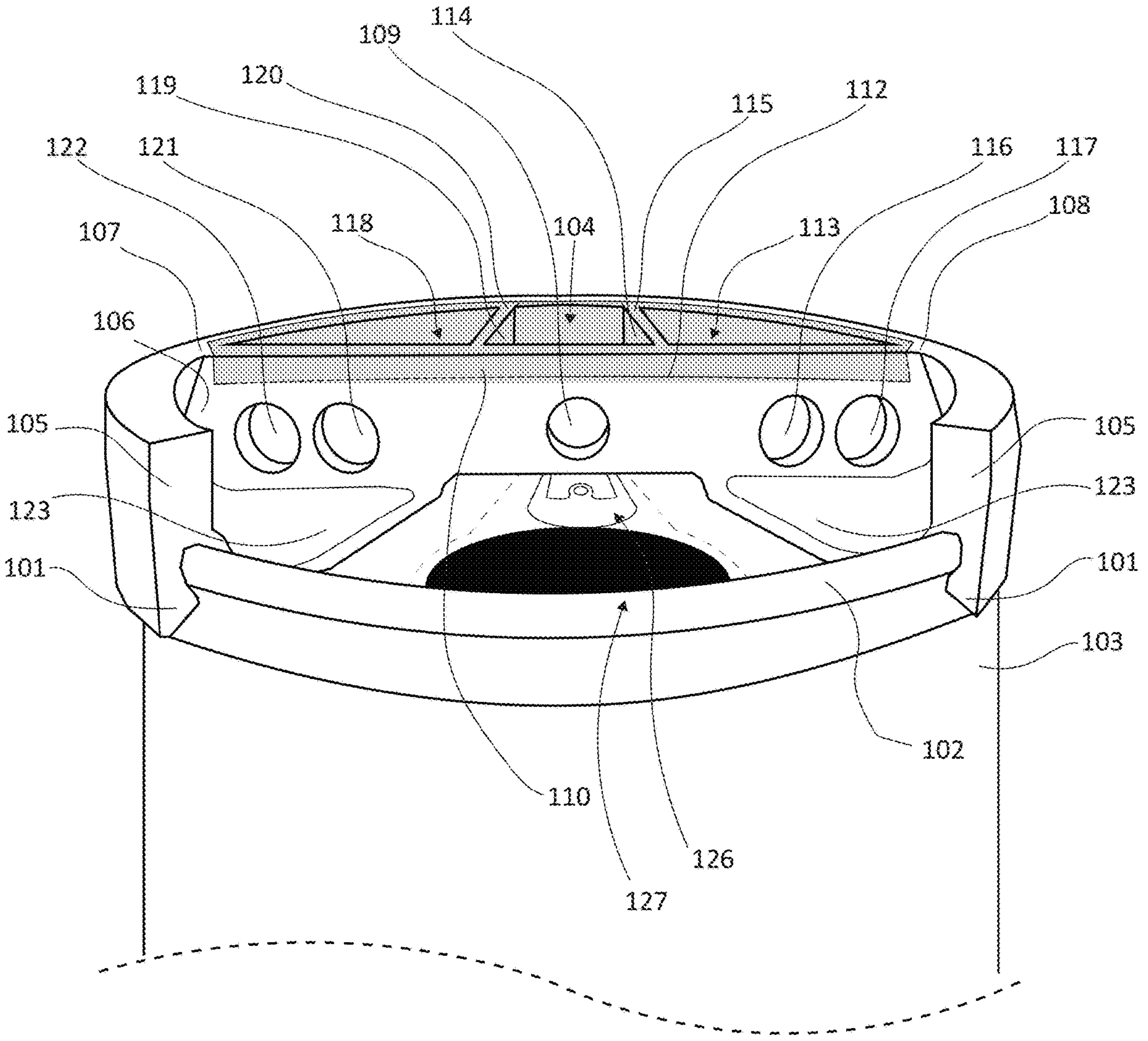
FIG. 1D shows the assembly of FIG. 1C with the selectively removable film removed by the user to allow contents of the flavor dispenser to combine with the beverage in the can.

FIG. 1C shows the flavor dispenser attached to the rim 102 of an opened aluminum can 103. The aluminum can has a tab 126 that is in the bent back position. The removable portion 111 of the film may include a tab 124 for easy removal, and may include an optional central tab 125. FIG. 1D shows the flavor dispenser and can after the removable portion 111 has been removed and portion 110 remains. The removable portion may be torn away along a separation line 112, which can be a perforated line as shown in FIG. 1D. In many cases, it is important for portion 110 to remain after portion 111 has been removed as it is needed to keep the flavors from coming out of the compartment. In some cases, however, it may be desired to remove the entire film including portions 110 and 111.

The film may be attached after filling the compartments with flavoring agent. The film may be attached using an adhesive or thermal bonding, or a combination of adhesive and thermal bonding. In one aspect, a different adhesive may be applied to the first film region 110 (permanent or semi-permanent region) and second film region 111 (removable portion). In this case, a stronger adhesive may be applied to the first film region 110 and a weaker adhesive may be applied to the second film region 111. Alternatively, a single adhesive may be applied to both while thermal energy may be applied over the first film region 110 to provide a stronger/more durable bond.

Figure 2:
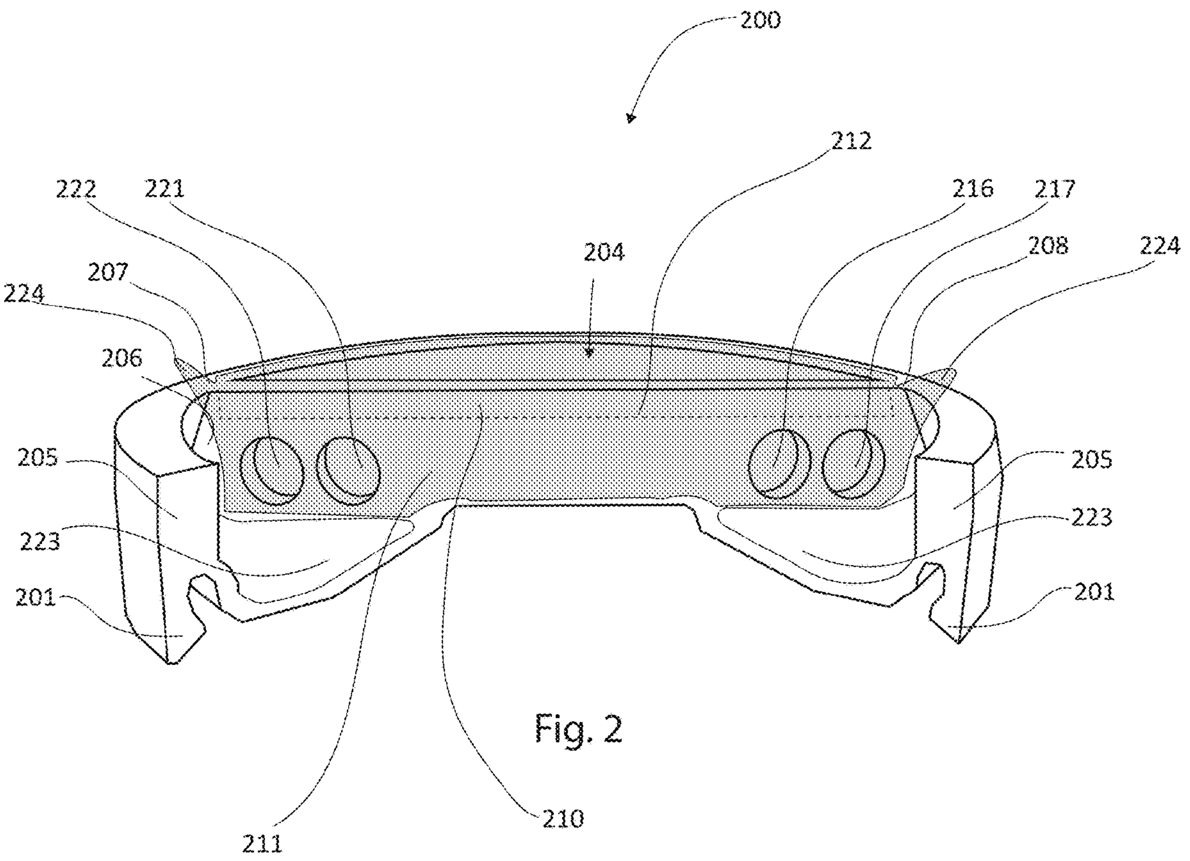
FIG. 2 shows a flavor dispenser for a beverage container according to another embodiment with a selectively removable film according to another aspect of the invention.

FIG. 2 shows a flavor dispenser 200 for a beverage container according to another embodiment with a selectively removable film according to another aspect of the invention. The flavor dispenser can be attached to the rim of a beverage container, e.g., an aluminum beer can, using a semicircular or circular ridge 201. This embodiment includes a single flavor container 204 defined by a first elevated region 205 and a second elevated region 206. The second elevated region comprising second passages 216, 217, 221, and 222. The passages are shown as circular passages although any shape may work, including rectangular, oval and/or square. Also, more or less passages may work with a single compartment.

The second elevated region 206 extends across the flavor dispenser and forms a compartment 204 by connecting with the first elevated region 205 at points along the arc at 207 and 208, and serves as a barrier between the flavor compartments and the beverage can. Where passages are provided closer to the side of the can as in this case, it may be desirable to provide a flat portion 223 that can guide flavor agents toward the opening of the can. A film is provided having a first film region 210 and a second film region 211, and at least one separation line 212 dividing at least a portion of the first film region and the second film region. The first film region is adapted to enclose one or more contents of the flavoring dispenser and the second film region is adapted to being removed in order to expose at least the first passage and allow the one or more contents of the flavoring dispenser to be dispensed and consumed with the beverage. The film region may include lateral tabs 224 on one or both sides of the removable portion 211 of the film. Notably, a central tab is not shown, although that could be optional.

Figure 3:
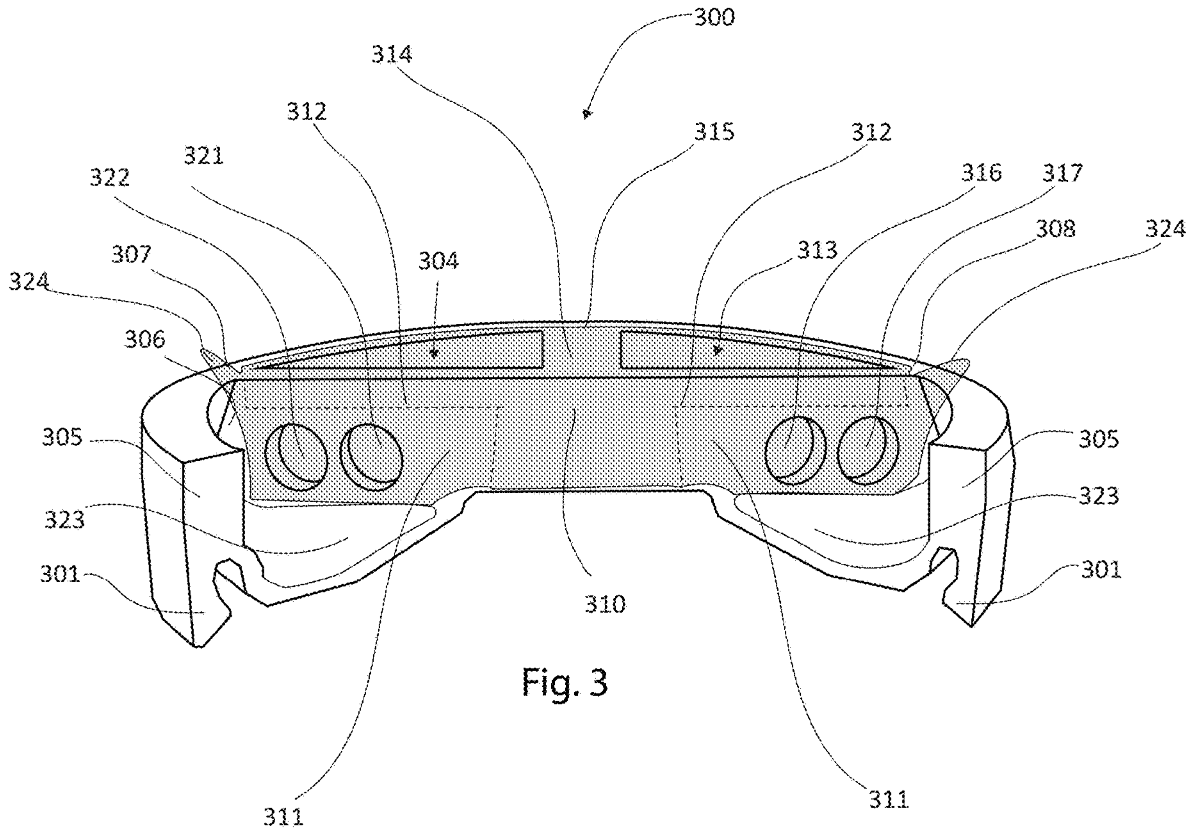
FIG. 3 shows a flavor dispenser for a beverage container according to another embodiment with a selectively removable film according to another aspect of the invention.

FIG. 3 shows a flavor dispenser 300 for a beverage container according to another embodiment with a selectively removable film according to another aspect of the invention. The flavor dispenser can be attached to the rim of a beverage container, e.g., an aluminum beer can, using a semicircular or circular ridge 301. This embodiment includes a first flavor container 304 and a second flavor container 313 a first elevated region 305 and a second elevated region 306, and a third elevated region 314 connecting the first elevated region at point 315 with the second elevated region 306. The second elevated region comprises passages 316, 317, 321, and 322. The passages are shown as circular passages although any shape may work, including rectangular, oval and/or square. Also, more or less passages may work with a single compartment.

The second elevated region 306 extends across the flavor dispenser and forms compartments 304, 314 by connecting with the first elevated region 305 at points along the arc at 315, and serves as a barrier between the flavor compartments and the beverage can. Where passages are provided closer to the side of the can as in this case, it may be desirable to provide a flat portion 323 that can guide flavor agents toward the opening of the can. A film is provided having a first film region 310 and a second film region 311, and at least one separation line 312 dividing at least a portion of the first film region and the second film region.

The first film region is adapted to enclose one or more contents of the flavoring dispenser and the second film region is adapted to being removed in order to expose at least the first passage and allow the one or more contents of the flavoring dispenser to be dispensed and consumed with the beverage. The film region may include lateral tabs 324 on one or both sides of the removable portion 311 of the film. Notably, a central tab is not shown, although that could be optional. In this case, the perforations 312 guide the removal of only portions covering the passages 316, 317, 321, and 322. This arrangement may be more desirable to minimize waste. Alternatively, the vertical portions of the separation line 312 could be non-perforated so that when the film is peeled back to reveal the passages, it stays intact minimizing potential problems with discarded portions of the film.

Other embodiments and uses of the invention will be apparent to those skilled in the art from consideration of the specification and practice of the invention disclosed herein. All references cited herein, including all U.S. and foreign patents and patent applications, are specifically and entirely hereby incorporated herein by reference. It is intended that the specification and examples be considered exemplary only, with the true scope and spirit of the invention indicated by the following claims.

What is claimed is:

1. A flavoring dispenser for a beverage comprising:

a semicircular or circular ridge defining an arc and adapted to secure the flavoring dispenser on the rim of a container of the beverage;

at least a first favoring compartment, the first flavoring compartment being defined at least partially by a first elevated region of the beverage flavoring dispenser that at least partially extends around the arc defined by the ridge, and a second elevated region that extends from a first point on the arc defined by the ridge to a second point on the arc defined by the ridge, the second elevated region comprising at least a first passage;

at least one film having a first film region and a second film region, and at least one separation line dividing at least a portion of the first film region and the second film region, the first film region adapted to enclose one or more contents of the flavoring dispenser and the second film region adapted to being removed in order to expose at least the first passage and allow the one or more contents of the flavoring dispenser to be dispensed and consumed with the beverage.

2. The flavoring dispenser of claim 1, further comprising a second flavoring compartment defined by the first elevated region and the second elevated region and further defined by a first partition between the first flavoring compartment and the second flavoring compartment comprising a third elevated region, the third elevated region extending from a third point on the arc defined by the ridge to the second elevated region, the second elevated region comprising at least a second passage adapted to allow contents of the second flavoring compartment to be dispensed and consumed with the beverage.

3. The flavoring dispenser of claim 2, further comprising a third passage in the second elevated region adapted to allow contents of the second flavoring compartment to be dispensed and consumed with the beverage.

4. The flavoring dispenser of claim 3, further comprising a third flavoring compartment defined by the first elevated region and the second elevated region and further defined by a second partition between the first flavoring compartment and the third flavoring compartment comprising a fourth elevated region, the fourth elevated region extending from a fourth point on the arc defined by the ridge to the second elevated region, the second elevated region comprising at least a fifth passage adapted to allow contents of the second flavoring compartment to be dispensed and consumed with the beverage.

5. The flavoring dispenser of claim 4, further comprising a sixth passage in the second elevated region adapted to allow contents of the third flavoring compartment to be dispensed and consumed with the beverage.

6. The flavoring dispenser of claim 1, further comprising a flat region adapted to allow the one or more contents of the flavoring dispenser to flow into the container of the beverage.

7. The flavoring dispenser of claim 1, wherein the second film region comprises a first tab that facilitates removal of the second film region.

8. The flavoring dispenser of claim 1, wherein the second film region comprises a centrally located tab.

9. The flavoring dispenser of claim 1, wherein the flavoring dispenser when attached to the container of the beverage is adapted to cover at least a portion of a tab for opening the container of the beverage.

10. The flavoring dispenser of claim 1, wherein the flavoring dispenser is adapted to leave exposed an opening of the container of the beverage after the flavoring dispenser has been attached to the container of the beverage.

11. A method of making a flavoring dispenser comprising:

adding at least one flavoring component to a first flavoring compartment of an unsealed flavoring dispenser, the unsealed flavoring dispenser comprising:

a semicircular or circular ridge defining an arc and adapted to secure the flavoring dispenser on the rim of a container of the beverage;

the first flavoring compartment being defined at least partially by a first elevated region of the beverage flavoring dispenser that at least partially extends around the arc defined by the ridge, and a second elevated region that extends from a first point on the arc defined by the ridge to a second point on the arc defined by the ridge, the second elevated region comprising at least a first passage;

attaching at least one film to the unsealed flavoring dispenser, the at least one film having a first film region and a second film region, and at least one separation line dividing at least a portion of the first film region and the second film region, the first film region adapted to enclose one or more contents of the flavoring dispenser and the second film region adapted to being removed in order to expose at least the first passage and allow the one or more contents of the flavoring dispenser to be dispensed and consumed with the beverage.

12. The method of claim 11, wherein the attaching step comprises using one or more adhesives.

13. The method of claim 12, wherein the adhesive is applied to the film before the attaching step.

14. The method of claim 11, wherein the attaching step comprises a thermal bonding step with or without adhesive.

15. The method of claim 11, further comprising adding a second flavoring component to a second flavoring compartment of the unsealed flavoring dispenser, wherein the second flavoring compartment is defined by the first elevated region and the second elevated region and further defined by a first partition between the first flavoring compartment and the second flavoring compartment comprising a third elevated region, the third elevated region extending from a third point on the arc defined by the ridge to the second elevated region, the second elevated region comprising at least a second passage adapted to allow contents of the second flavoring compartment to be dispensed and consumed with the beverage.

16. The method of claim 15, further comprising adding a third flavoring component to a third flavoring compartment of the unsealed flavoring dispenser, wherein the third flavoring compartment is defined by the first elevated region and the second elevated region and further defined by a second partition between the first flavoring compartment and the third flavoring compartment comprising a fourth elevated region, the fourth elevated region extending from a fourth point on the arc defined by the ridge to the second elevated region, the second elevated region comprising at least a fifth passage adapted to allow contents of the second flavoring compartment to be dispensed and consumed with the beverage.

17. The method of claim 16, wherein the flavoring components comprise a liquid flavoring component and a solid flavoring component.

18. The method of claim 11, wherein the first film region and second film region are two separate films placed on either side of the dividing line.

19. A method of using the flavoring dispenser of claim 1, comprising opening a beverage, placing the flavoring dispenser on the beverage can, and removing the second film region.

20. The method of claim 18, wherein removing the second film region comprises tearing along a perforated portion of the film defining the separation line.

* * * * *